(12) United States Patent
Fujiwara et al.

(10) Patent No.: US 10,245,636 B2
(45) Date of Patent: Apr. 2, 2019

(54) METHOD FOR MANUFACTURING CORE, AND METHOD FOR MANUFACTURING TURBINE MEMBER IN WHICH CORE IS ACQUIRED BY SAID CORE MANUFACTURING METHOD

(71) Applicant: MITSUBISHI HEAVY INDUSTRIES, LTD., Tokyo (JP)

(72) Inventors: Kosuke Fujiwara, Tokyo (JP); Sachio Shimohata, Tokyo (JP); Kazutaka Mori, Tokyo (JP); Hidetaka Oguma, Tokyo (JP); Ikuo Okada, Tokyo (JP); Yoshitaka Uemura, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 227 days.

(21) Appl. No.: 15/107,277

(22) PCT Filed: Mar. 5, 2015

(86) PCT No.: PCT/JP2015/056516
§ 371 (c)(1),
(2) Date: Jun. 22, 2016

(87) PCT Pub. No.: WO2015/137232
PCT Pub. Date: Sep. 17, 2015

(65) Prior Publication Data
US 2017/0028461 A1    Feb. 2, 2017

(30) Foreign Application Priority Data

Mar. 12, 2014    (JP) .................................. 2014-049227

(51) Int. Cl.
*B22C 9/10*    (2006.01)
*B22C 9/24*    (2006.01)
(Continued)

(52) U.S. Cl.
CPC ................ *B22C 9/10* (2013.01); *B28B 1/001* (2013.01); *B33Y 10/00* (2014.12); *B33Y 80/00* (2014.12); *Y02P 10/292* (2015.11)

(58) Field of Classification Search
CPC .................................... B22C 9/10; B22C 9/24
(Continued)

(56) References Cited

U.S. PATENT DOCUMENTS

2008/0274374 A1* 11/2008 Ina ............................ B22C 1/00
428/687

FOREIGN PATENT DOCUMENTS

JP          3-18451         1/1991
JP          4-100654        4/1992
(Continued)

OTHER PUBLICATIONS

International Search Report dated Jun. 9, 2015 in corresponding International Application No. PCT/JP2015/056516.
(Continued)

*Primary Examiner* — Kevin P Kerns
(74) *Attorney, Agent, or Firm* — Wenderoth, Lind & Ponack, L.L.P.

(57) ABSTRACT

A method for manufacturing a core (S1) includes: a coating step (S20) of adding an organic binder to a large particle group composed of silica-containing large particles, and coating surfaces of the large particles with the organic binder; a mixing step (S30) of mixing, after the coating step (S20), the large particle group and a small particle group composed of silica-containing small particles having a smaller particle size than the large particles; a laminate shaping step (S40) of forming, after the mixing step (S30), a molding in which a mixture of the large and small particle groups is used; and a sintering step (S60) of sintering the molding after the laminate shaping step (S40).

11 Claims, 4 Drawing Sheets

(51) Int. Cl.
*B28B 1/00* (2006.01)
*B33Y 10/00* (2015.01)
*B33Y 80/00* (2015.01)

(58) Field of Classification Search
USPC ............ 164/15, 23, 520, 525, 526, 132, 369
See application file for complete search history.

(56) References Cited

FOREIGN PATENT DOCUMENTS

| | | |
|---|---|---|
| JP | 4-220134 | 8/1992 |
| JP | 8-257673 | 10/1996 |
| JP | 8-509666 | 10/1996 |
| JP | 2004-330280 | 11/2004 |
| JP | 2006-247743 | 9/2006 |
| JP | 2006-255782 | 9/2006 |
| JP | 2008-207238 | 9/2008 |
| JP | 2011-104651 | 6/2011 |
| JP | 2013-252552 | 12/2013 |
| KR | 1991-0009367 | 11/1991 |

OTHER PUBLICATIONS

Written Opinion of the International Searching Authority dated Jun. 9, 2015 in corresponding International Application No. PCT/JP2015/056516.
"Development of rapid molding technology of precision casting molds and cores by rapid prototyping", Japan Foundry Society, Inc., Mar. 2012 (with concise explanation).

* cited by examiner

METHOD FOR MANUFACTURING CORE, AND METHOD FOR MANUFACTURING TURBINE MEMBER IN WHICH CORE IS ACQUIRED BY SAID CORE MANUFACTURING METHOD

TECHNICAL FIELD

The present invention relates to a method for manufacturing a core, and a method for manufacturing a turbine member in which the core is acquired by the core manufacturing method.

Priority is claimed on Japanese Patent Application No. 2014-049227, filed on Mar. 12, 2014, the content of which is incorporated herein by reference.

BACKGROUND ART

Cores for precision casting (core materials) used when components such as rotor blades and stator vanes for gas turbines are formed of a ceramic, etc. by a precision casting method. This precision casting method includes a slip casting method, an injection molding method, and so on. The slip casting method molds a core by pouring a slurry in which ceramic powder is mixed into water, etc. into a plaster mold and drying the slurry. The injection molding method prepares a metal mold, heats an injection molding raw material that is in a pellet shape and is formed of a ceramic, or the like using an injection molding machine, and pours the injection molding raw material into the metal mold. This metal mold is cooled, and thereby a core is molded.

The core manufacturing method includes another laminate shaping method. In the laminate shaping method, a laser is applied to material powder such as a ceramic disposed in a layer, and selectively solidifies only a necessary portion from the layer. Afterwards, the layer to which the laser is applied is used as a first layer, and new material powder is disposed on the first layer and is formed as a second layer. A laser is also applied to the second layer and selectively solidifies only a necessary portion, and in the meantime, joins the solidified portion with the portion solidified in the first layer. These steps are repeated, and thereby a core having an intended three-dimensional shape while being laminated layer by layer is formed in the laminate shaping method.

For example, in the description of Patent Literature 1, a ceramic core formed by this laminate shaping method is impregnated with a ceramic reinforcing liquid, and then is sintered. Thereby, the core is manufactured. This core is used to perform injection molding, and thereby a desired casting is manufactured.

CITATION LIST

Patent Literature

[Patent Literature 1]
Japanese Unexamined Patent Application, First Publication No. 2004-330280

SUMMARY OF INVENTION

Technical Problem

However, in the laminate shaping method, there is a possibility of a strength being weakened, compared to a method of using a mold such as a typical metal mold to carry out molding.

The present invention provides a method for manufacturing a core, capable of manufacturing the core whose strength is improved while molding is performed by a laminate shaping method.

Solution to Problem

To solve the above problem, the present invention proposes the following means.

A method for manufacturing a core in an aspect of the present invention includes: a coating step of adding an organic binder to a large particle group composed of silica-containing large particles, and coating surfaces of the large particles with the organic binder; a mixing step of mixing, after the coating step, the large particle group and a small particle group composed of silica-containing small particles having a smaller particle size than the large particles; a laminate shaping step of forming, after the mixing step, a molding using to a laminate shaping method in which a mixture of the large and small particle groups is used; and a sintering step of sintering the molding after the laminate shaping step.

According to this constitution, heat is applied in the laminate shaping step or the sintering step. Thereby, the organic binder is thermally cured, and the large particles can be bonded to each other via the organic binder. Therefore, bonding strength between the particles can be improved by the organic binder. The small particles having small particle sizes are mixed with the large particle group of the large particles coated with the organic binder. For this reason, the small particles having the small particle sizes can enter between the neighboring large particles to form a dense structure as a mixture. Thus, the bonding strength between the particles can be further improved. In addition, the small particles are not coated with the organic binder. Thereby, the particle sizes of the small particles can be kept smaller, and the small particles can be brought in close proximity and bonded to the large particles such that central positions thereof come closer to each other. For this reason, the mixture can be formed with high density, and the bonding strength between the particles can be improved even more. This mixture is used, molded in the laminate shaping step, and sintered in the sintering step. Thereby, the core having a complicated three-dimensional shape can be easily manufactured. That is, it is possible to easily manufacture the core in which the bonding strength between the particles is enhanced, and the strength is improved while molding a complicated shape.

The core manufacturing method may include an impregnating step of impregnating the molding with an impregnant between the laminate shaping step and the sintering step.

According to this constitution, prior to the sintering step, the molding is impregnated with the impregnant in the impregnating step. Thereby, air contained in the molding can be substituted by the impregnant, and the molding can be formed into a denser structure. Therefore, the bonding strength between the particles can be improved even more.

A method for manufacturing a turbine member in another aspect of the present invention includes: a step of acquiring the core using the core manufacturing method; and a step of removing, after a molten metal fed between the core and a casting mold is solidified, the core to acquire the turbine member having a hollow portion.

According to this constitution, the turbine member can be easily manufactured.

Advantageous Effects of Invention

According to the present invention, the mixture of the large particle group coated with the organic binder and the small particle group is used, and thereby the strength thereof can be improved while being molded by the laminate shaping method.

DESCRIPTION OF EMBODIMENTS

Hereinafter, an embodiment according to the present invention will be described with reference to FIGS. 1 to 6.

A method for manufacturing a core S1 is a method of manufacturing a core used when a laminate shaping method is used to form a cast component. The core manufactured by the present method is used in a method of manufacturing a turbine member such as a turbine vane, a turbine blade, a ring segment, a combustor component, or the like. To be specific, the method of manufacturing the turbine member includes a step of acquiring the core manufactured by the present method, and a step of solidifying a molten metal fed between a mold and the core installed in the mold, and then removing the core to acquire the turbine member having a hollow portion. That is, in the method of manufacturing the turbine member, after the molten metal is fed between the mold and the core, the core removed from the molten metal after solidification, and thereby the turbine member having the hollow portion corresponding to this core is manufactured.

Figure 1:
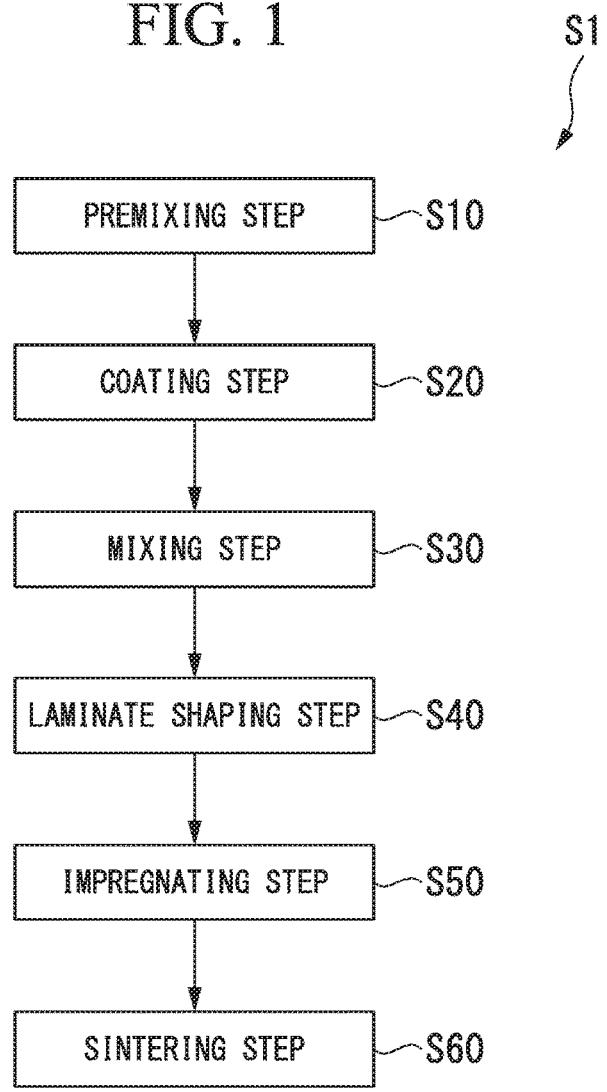
FIG. 1 is a flow chart for describing steps of a method for manufacturing a core in an embodiment of the present invention.

The core manufacturing method S1 is the method of manufacturing the core used when the laminate shaping method is used to form the cast component. As shown in FIG. 1, the core manufacturing method S1 in the present embodiment includes a premixing step S10 of mixing core sand composed of large particles having a plurality of particle sizes to generate a large particle group 10, a coating step S20 of coating, after the premixing step S10, the large particle group 10 with an organic binder 20, and a mixing step S30 of mixing, after the coating step S20, the large particle group 10 and a small particle group 30 of core sand composed of small particles 31 having a smaller particle size than the large particles. The core manufacturing method S1 in the present embodiment includes a laminate shaping step S40 of forming, after the mixing step S30, a molding 41 by a laminate shaping method in which a mixture 40 of the mixed large and small particle groups 10 and 30 is used, an impregnating step S50 of impregnating, after the laminate shaping step S40, the molding 41 with an impregnant 50, and a sintering step S60 of sintering the molding 41 after the impregnating step S50.

Figure 2:
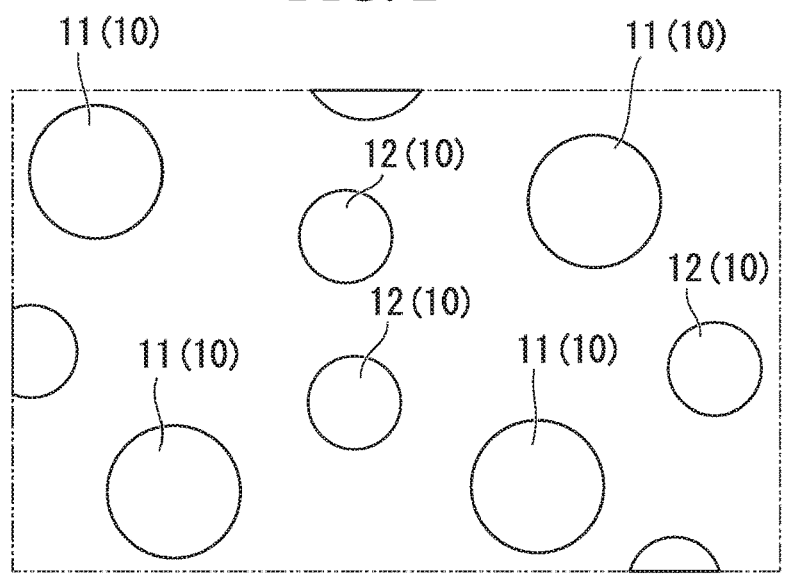
FIG. 2 is a schematic view for describing first and second large particles after a premixing step in the embodiment of the present invention.

The premixing step S10 generates the large particle group 10 composed of the large particles by mixing a plurality of types of core sand having different particle sizes as silica-containing large particles. Here, the large particles in the present embodiment are core sand whose particle size is equal to or more than 10 μm and equal to or less than 50 μm, and preferably spherical core sand whose particle size ranges from 20 μm to 40 μm. In the premixing step S10 of the present embodiment, first large particles 11 and second large particles 12 are mixed as two types of core sand, and the large particle group 10 as shown in FIG. 2 is generated. To be specific, in the premixing step S10 of the present embodiment, powder of molten silica whose particle size is about 38 μm as the first large particles 11 and powder of alumina whose particle size is about 20 μm as the second large particles 12 are mixed using a ball mill. In the premixing step S10, the large particle group 10 is generated as mixed powder in which these are mixed.

The large particle group 10 composed of the generated silica-containing large particles is not limited to a combination of the present embodiment. Other materials may be used as long as they contain silica. For example, for the large particle group 10, part or all of molten silica and alumina used as the core sand of the mixed large particles may be cristobalite.

Figure 3:
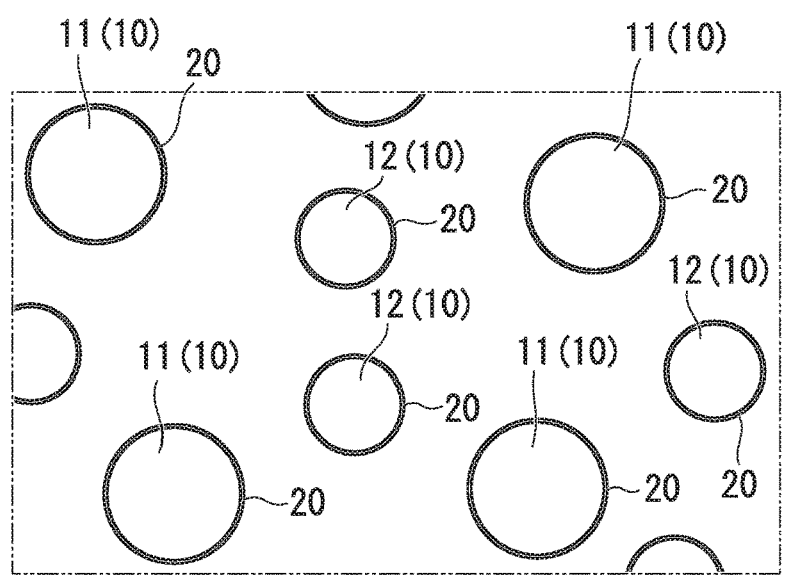
FIG. 3 is a schematic view for describing the first and second large particles after a coating step in the embodiment of the present invention.

The coating step S20 adds the organic binder 20 to the large particle group 10 composed of the silica-containing large particles generated in the premixing step S10, and coats surfaces of the large particles with this organic binder 20. In the present embodiment, as the organic binder 20, organic matter containing a phenol resin and aromatic amines is used. In the coating step S20 of the present embodiment, the coating is carried out using, for instance, a hot marring method. To be specific, in the coating step S20, the large particle group 10 is input into a rotary drum, and the organic binder 20 in liquid form while rotating the rotary drum is sprayed onto and added to the large particle group 10. Afterwards, in the coating step S20, the large particle group 10 onto which the organic binder 20 is sprayed is cooled, and as shown in FIG. 3, the surfaces of the first and second large particles 11 and 12 are coated with the organic binder 20.

Figure 4:
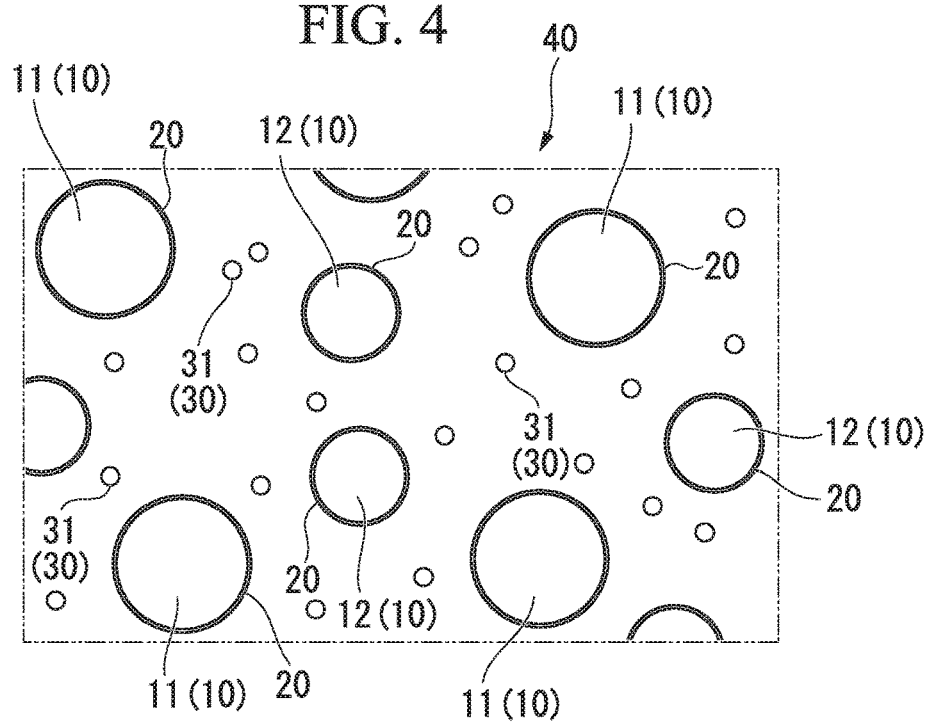
FIG. 4 is a schematic view for describing a mixture after a mixing step in the embodiment of the present invention.

The mixing step S30 mixes the large particle group 10 coated with the organic binder 20 in the coating step S20 and the small particle group 30 composed of the small particles 31 having a smaller particle size than that the large particles. Here, the small particles 31 in the present embodiment are core sand whose particle size is equal to or more than 0.1 μm and is equal to or less than 10 μm, and preferably spherical core sand whose particle size ranges from 0.3 μm to 0.5 μm. To be specific, in the mixing step S30 of the present embodiment, powder of the large particle group 10 composed of molten silica and alumina coated with the organic binder 20 and powder of particles that are the same materials as the first and second large particles 11 and 12 serving as the core sand of the small particles 31 and having different particle sizes are mixed. Thereby, in the mixing step S30, as shown in FIG. 4, a powdery mixture 40 in which the small particles 31 are mixed between the first large particles 11 and the second large particles 12 is generated.

Figure 5:
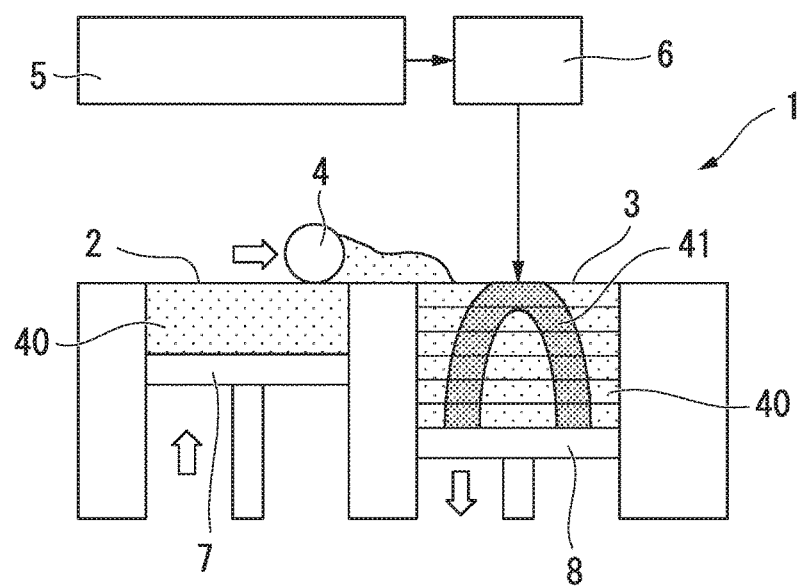
FIG. 5 is a schematic view for describing a laminate shaping apparatus in the embodiment of the present invention.

In the laminate shaping step S40, the molding 41 is formed by the laminate shaping method using the mixture 40. The laminate shaping step S40 of the present embodiment uses a laminate shaping apparatus 1 using a laser as shown in FIG. 5 to mold the molding 41 using to a powder sintering laminate shaping method.

The laminate shaping apparatus 1 has a feed area 2 to which a powdery material is fed, a shaping area 3 in which the molding 41 is formed, a roller 4 that sends the material from the feed area 2 to the shaping area 3, a scanning mechanism 6 that applies a laser fed from a laser main body 5 to an arbitrary position within the material of the shaping area 3, a feed piston 7 that vertically displaces the feed area 2, and a shaping piston 8 that vertically displaces the shaping area 3.

To be specific, in the laminate shaping step S40 of the present embodiment, this laminate shaping apparatus 1 is used to send the powdery mixture 40 from the feed area 2, into which the powdery mixture 40 serving as the material is input, to the shaping area 3 layer by layer by the roller 4. One layer used herein refers to a predetermined depth at which the mixture 40 can be solidified by the laser emitted from the laser main body 5 via the scanning mechanism 6. Afterwards, in the laminate shaping step S40, the laser emitted from the laser main body 5 via the scanning mechanism 6 is applied to the mixture 40 sent to the shaping area 3 within a necessary range depending on a shape of the molding 41 to be molded. The mixture 40 of the portion to which the laser is applied is melted and solidified. If the application of the laser is completed, the shaping piston 8 is lowered by a depth corresponding to one layer, and the feed piston 7 is raised by the same depth corresponding to one layer. One layer of the mixture 40 is again sent from the feed area 2 to the shaping area 3 by the roller 4, and the mixture 40 becoming a second layer is disposed in the shaping area 3. In the laminate shaping step S40, as these steps are repeated, the mixture 40 is solidified by the laminate shaping apparatus 1, and the molding 41 having an arbitrary shape is formed and acquired.

The impregnating step S50 is carried out between the laminate shaping step S40 and the sintering step S60, and impregnates the formed molding 41 with the impregnant 50 to further harden the molding 41. The impregnating step S50 of the present embodiment uses a slurry in which a ceramic is contained as the impregnant 50. The impregnating step S50 impregnates the molding 41 in a pressure reducing container to release air contained in the molding 41, and presses the impregnant 50 into the molding 41. The impregnant 50 used herein includes, for instance, a mixture of silica sol and silica or a mixture of silica sol and alumina.

Figure 6:
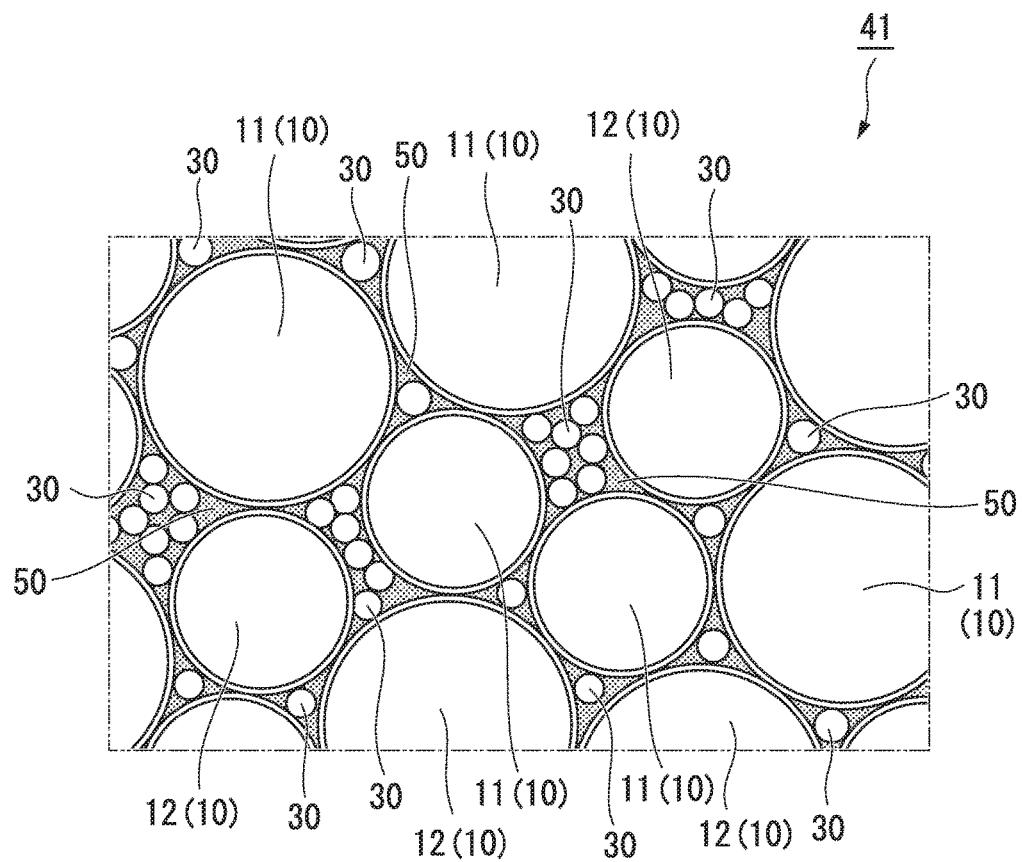
FIG. 6 is a schematic view for describing a mixture after a sintering step in the embodiment of the present invention.

The sintering step S60 sinters the molding 41 impregnated with the impregnant 50 to harden the molding 41. The sintering step S60 of the present embodiment sinters the molding 41, and thereby, as shown in FIG. 6, each particle of the mixture 40 of the molding 41 is bonded, and the core is manufactured. To be specific, for example, the sintering step S60 is carried out at 1200° C. for 15 hours.

According to the core manufacturing method S1 as described above, the large particle group 10 in which the first and second large particles 11 and 12 that are two types of large particles are mixed in the premixing step S10 is coated with the organic binder 20 in liquid form in the coating step S20, and thereby the surfaces of the first and second large particles 11 and 12 can be covered with the organic binder 20. In this state, heat is applied in the laminate shaping step S40 or the sintering step S60. Thereby, the organic binder 20 is thermally cured, and the first and second large particles 11 and 12, the first large particles 11, or the second large particles 12 can be bonded to each other via the organic binder 20. Therefore, bonding strength between the particles can be improved by the organic binder 20 in liquid form.

In the present embodiment, the small particles 31 having small particle sizes as the core sand are mixed with the large particle group 10 of the first and second large particles 11 and 12 which is coated with the organic binder 20. For this reason, the small particles 31 having the small particle sizes can enter between the neighboring first and second large particles 11 and 12 to form a dense structure as a mixture. To be specific, even if the first and second large particles 11 and 12 having large particle sizes are mixed, an interstice occurs between the respective particles. The small particles 31 having a smaller particle size than the large particles are mixed, and thereby the small particles 31 are disposed to be buried in the interstices, and are bonded to the first large particles 11 or the second large particles 12. As a result, in a state in which the generated mixture has very small interstices between the particles and has a dense structure with a high density, the particles can be bonded to each other. For this reason, the bonding strength between the particles can be further improved.

In addition, the small particles 31 are not coated with the organic binder 20, and thereby the particle sizes of the small particles 31 can be kept small. Therefore, the small particles 31 can be brought in close proximity and bonded to the first and second large particles 11 and 12 such that central positions thereof come closer to each other. For this reason, the mixture can be formed with high density, and the bonding strength between the particles can be improved even more.

This mixture 40 is used, molded by the laminate shaping step S40, and sintered in the sintering step S60. Thereby, the core having a complicated three-dimensional shape can be easily manufactured. That is, it is possible to easily manufacture the core in which the bonding strength between the grains of core sand that are the first large particles 11, the second large particles 12, or the small particles 31 is enhanced, and the strength is improved while molding a complicated shape. Therefore, the mixture of the large particle group 10 coated with the organic binder 20 and the small particle group 30 is used to carry out the laminate shaping step S40, and thereby the strength can be improved while the molding is performed by the laminate shaping method.

Prior to the sintering step S60, the molding 41 is impregnated with the impregnant 50 in the impregnating step S50. Thereby, the air contained in the molding 41 can be substituted by the slurry of a ceramic, etc., and the molding 41 can be formed into a denser structure. Therefore, the bonding strength between the particles can be improved even more, and the core in which the strength is further improved can be manufactured.

The core prepared by this method is used to perform casting, and thereby the turbine member can be easily formed.

Although the embodiments of the present invention have been described above in detail with reference to the drawings, the constitutions and the combinations thereof in the embodiments are only examples, and additions, omissions, substitutions, and other modifications of the constitutions are possible without departing from the spirit of the present invention. The present invention is not limited by the embodiments, but is only limited by the appended claims.

INDUSTRIAL APPLICABILITY

According to the core manufacturing method, the mixture of the large particle group coated with the organic binder and the small particle group is used, and thereby the strength thereof can be improved while being molded by the laminate shaping method.

REFERENCE SIGNS LIST

S1 Method for manufacturing core
S10 Premixing step

11 First large particle
12 Second large particle
10 Large particle group
S20 Coating step
20 Organic binder
S30 Mixing step
30 Small particle group
31 Small particle
40 Mixture
41 Molding
S40 Laminate shaping step
1 Laminate shaping apparatus
2 Feed area
3 Shaping area
4 Roller
5 Laser main body
6 Scanning mechanism
7 Feed piston
8 Shaping piston
S50 Impregnating step
50 Impregnant
S60 Sintering step

The invention claimed is:

1. A method for manufacturing a core comprising:
a coating step of adding a binder to a large particle group composed of large particles, and only coating surfaces of the large particles with the binder;
a mixing step of mixing, after the coating step, the large particle group and a small particle group composed of small particles having a smaller particle size than the large particles and not coated with the binder; and
a laminate shaping step of forming, after the mixing step, a molding in which a mixture of the large and small particle groups is used,
wherein particle sizes of the large particles are equal to or more than 10 μm and equal to or less than 50 μm, and particle sizes of the small particles are equal to or more than 0.1 μm and equal to or less than 10 μm.

2. The method according to claim 1, wherein at least one of the large particles and the small particles contains silica.

3. The method according to claim 1, wherein the large particle group contains first large particles composed of silica powder and second large particles composed of alumina powder.

4. The method according to claim 1 wherein the binder is organic matter.

5. The method according to claim 4, wherein the organic matter contains a phenol resin and aromatic amines.

6. The method according to claim 1, wherein the coating step comprises inputting the large particle group into a rotary drum, and spraying the binder in liquid form while rotating the rotary drum onto the large particles.

7. The method according to claim 1, comprising a sintering step of sintering the molding after the laminate shaping step.

8. The method according to claim 7, wherein the sintering step is carried out at 1200° C. for 15 hours.

9. The method according to claim 8, wherein the impregnant is a mixture of silica sol and silica, or a mixture of silica sol and alumina.

10. The method according to claim 7, comprising an impregnating step of impregnating the molding with an impregnant between the laminate shaping step and the sintering step.

11. A method for manufacturing a turbine member comprising:
a step of acquiring the core using the method according to claim 1; and
a step of removing, after a molten metal fed between the core and a casting mold is solidified, the core to acquire the turbine member having a hollow portion.

* * * * *